(12) United States Patent
Vicente et al.

(10) Patent No.: US 9,043,773 B2
(45) Date of Patent: May 26, 2015

(54) IDENTIFICATION AND MANAGEMENT OF UNSAFE OPTIMIZATIONS

(71) Applicants: Alejandro M. Vicente, Barcelona (ES); Joseph M. Codina, Hospitalet de Llobregat (ES); Christos E. Kotselidis, Barcelona (ES); Carlos Madriles, Barcelona (ES); Raul Martinez, Barcelona (ES)

(72) Inventors: Alejandro M. Vicente, Barcelona (ES); Joseph M. Codina, Hospitalet de Llobregat (ES); Christos E. Kotselidis, Barcelona (ES); Carlos Madriles, Barcelona (ES); Raul Martinez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 13/977,118
(22) PCT Filed: Mar. 15, 2013
(86) PCT No.: PCT/US2013/031935
§ 371 (c)(1),
(2) Date: Jun. 28, 2013
(87) PCT Pub. No.: WO2014/142949
PCT Pub. Date: Sep. 18, 2014

(65) Prior Publication Data
US 2014/0282451 A1 Sep. 18, 2014

(51) Int. Cl.
G06F 9/45 (2006.01)
(52) U.S. Cl.
CPC .................................. G06F 8/443 (2013.01)
(58) Field of Classification Search
None
See application file for complete search history.

(56) References Cited

U.S. PATENT DOCUMENTS

| | | | |
|---|---|---|---|
| 8,032,875 B2 * | 10/2011 | Kosche et al. | 717/158 |
| 8,079,031 B2 | 12/2011 | Santhanakrishnan et al. | |
| 8,095,513 B2 | 1/2012 | Grunkemeyer et al. | |
| 2003/0005271 A1 * | 1/2003 | Hsu et al. | 712/237 |
| 2004/0010675 A1 * | 1/2004 | Moritz | 711/202 |
| 2005/0080980 A1 * | 4/2005 | Wu et al. | 711/1 |
| 2005/0132238 A1 * | 6/2005 | Nanja | 713/300 |
| 2006/0143421 A1 * | 6/2006 | Subramoney et al. | 711/170 |
| 2007/0214342 A1 * | 9/2007 | Newburn et al. | 712/216 |
| 2007/0226698 A1 * | 9/2007 | Cascaval et al. | 717/127 |
| 2007/0239505 A1 | 10/2007 | Shukla et al. | |
| 2011/0214016 A1 * | 9/2011 | Gschwind | 714/16 |
| 2012/0110583 A1 | 5/2012 | Balko et al. | |
| 2012/0124560 A1 * | 5/2012 | Indukuru et al. | 717/127 |

OTHER PUBLICATIONS

Rajiv Kappor, "Avoiding the Cost of Branch Misprediction", Feb. 20, 2009, Intel Developer Zone (Whole Document).*
International Search Report and Written Opinion received for Patent Application No. PCT/US2013/031935, mailed on Nov. 26, 2013, 10 pages.
International Search Report and Written Opinion received for PCT Patent Application No. PCT/US2013/031935, mailed on Nov. 26, 2013, 10 pages.

* cited by examiner

*Primary Examiner* — Don Wong
*Assistant Examiner* — Roberto E Luna
(74) *Attorney, Agent, or Firm* — Lowenstein Sandler LLP

(57) ABSTRACT

Techniques for implementing identification and management of unsafe optimizations are disclosed. A method of the disclosure includes receiving, by a managed runtime environment (MRE) executed by a processing device, a notice of misprediction of optimized code, the misprediction occurring during a runtime of the optimized code, determining, by the MRE, whether a local misprediction counter (LMC) associated with a code region of the optimized code causing the misprediction exceeds a local misprediction threshold (LMT) value, and when the LMC exceeds the LMT value, compiling, by the MRE, native code of the optimized code to generate a new version of the optimized code, wherein the code region in the new version of the optimized code is not optimized.

19 Claims, 8 Drawing Sheets

IDENTIFICATION AND MANAGEMENT OF UNSAFE OPTIMIZATIONS

TECHNICAL FIELD

The embodiments of the disclosure relate generally to processing devices and, more specifically, relate to identification and management of unsafe optimizations.

BACKGROUND

Modern platform-independent high-level programming languages, such as Java™ and C++, have significant market presence in the computing industry. Typically, programs written in these languages execute in a managed runtime environment (MRE) that provide automatic memory management, type management, thread and synchronization, and dynamic loading facilities.

MREs typically support just-in-time (JIT) compilation. The programs written in high-level programming languages are generally first compiled in codes in a platform-neutral distribution called bytecode. Bytecode is not machine code for any particular computer, and may be portable among computer architectures. The JIT compiler reads the bytecode in many sections and compiles them dynamically into machine language so that the program can run faster (optimized).

In some cases, the optimizations performed by the MRE in compiling bytecode may be unsafe (e.g., a misprediction). For instance, if a memory instruction is reordered, the optimization may be correct most of the time and performance may be improved, but at some point the optimization's assumptions may not hold. The MRE generally handles these mispredictions in the optimizations by discarding the speculative version and falling back to a pessimized version of the code. A problem with this approach is that the processor may lose performance because some optimizations are safe most of the time, with rare occurrence of mispredictions, so it is better not to pessimize these optimizations.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
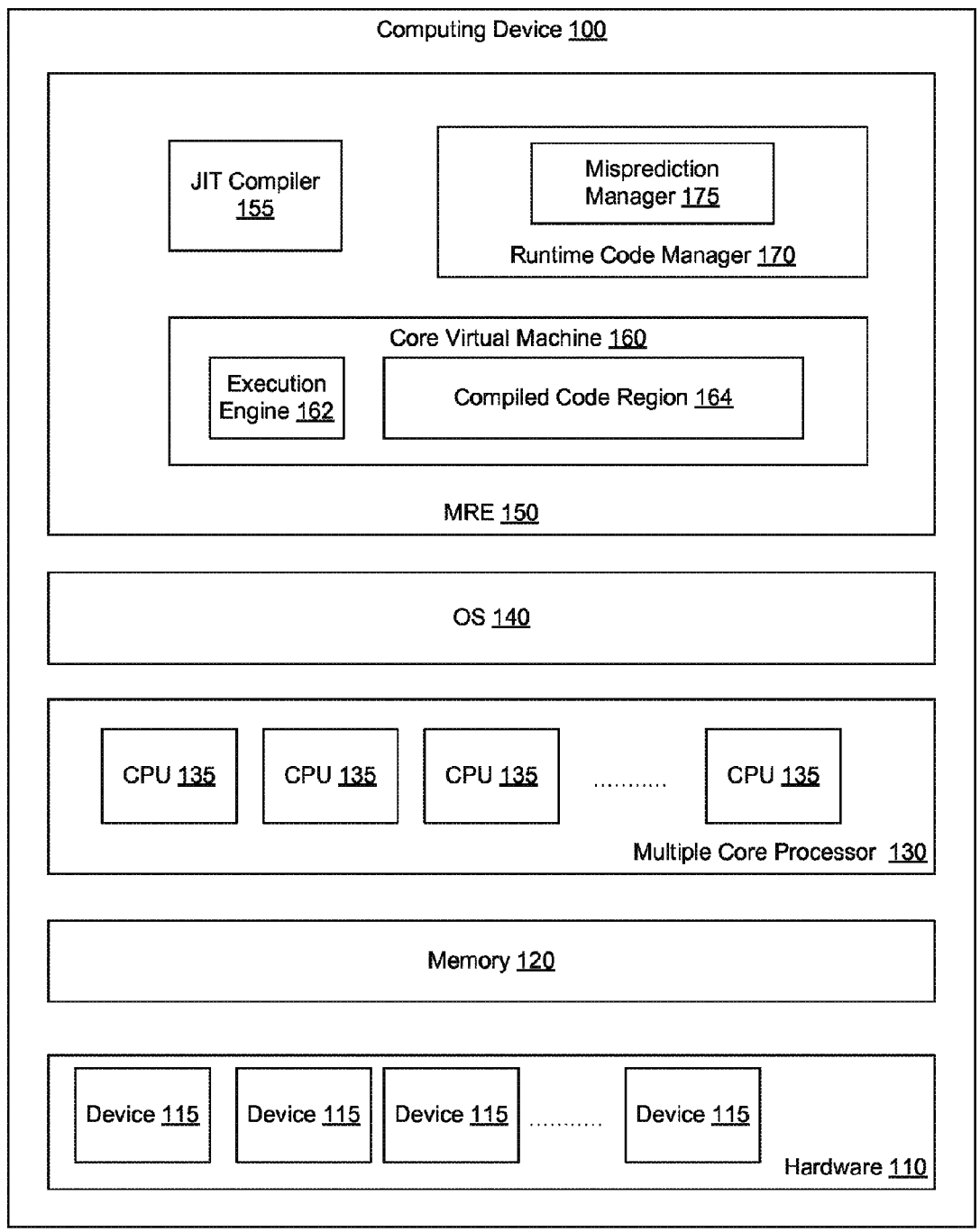
FIG. 1 illustrates a block diagram of a micro-architecture for a computing device implementing identification and management of unsafe optimizations in which at least one embodiment of the disclosure may be used.

Embodiments of the disclosure provide for identification and management of unsafe optimizations. Code of a program may be optimized using a managed runtime environment (MRE). Once a misprediction of the optimized code occurs during runtime, recovery mechanisms may be implemented and the MRE is invoked to manage this situation. Often, when a misprediction (i.e., unsafe optimization) occurs, the processor executing the optimized code can recover to a safe state. For each region of the code that is optimized unsafely, a safe version of the code may be generated as well.

A previous solution issued the non-optimized version of the code and resumed execution. However, if the optimizations fail often, performance suffers using this solution due to many rollbacks/runtime/restart cycles. Another solution for this problem is to completely disable the optimized version of the code and only use the safe version. However, if this solution is applied frequently, the system may benefit less from the unsafe optimizations that are most of the time correct (e.g., may fail infrequently). In order to overcome this and to still obtain the benefits from the most common cases where the optimization does help, embodiments of the disclosure provide techniques for keeping track of the mispredictions, identifying delinquent portions of optimized code, and selectively pessimizing (e.g., removing optimizations on the code) these identified portions of the optimized code. In other words, embodiments of the disclosure isolate particular portions of optimized code that frequently cause unsafe optimizations and disable optimizations for these identified portions of code.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 is a block diagram of a micro-architecture for a computing device 100 implementing identification and management of unsafe optimizations accordance with one embodiment of the disclosure. In one embodiment, computing device 100 may include, but is not limited to, a laptop, desktop, handheld personal computer (PC), personal digital assistant, engineering workstation, server device, network device, network hub, switch, embedded processor, digital signal processor, graphics device, video game device, set-top box, micro controller, cell phone, portable media player, hand held device, table computing device, and any other various electronic device, for example.

Computing device 100 may include a hardware block 110, memory 120, and a multiple (multi)-core processor 130. In some embodiment, multi-core processor 130 may be implemented as a single core processor. In other embodiments, more than one multi-core processor 130 may be included in computing device 100. The multi-core processor 103 may include any variety of processing devices having a plurality of cores. One embodiment of multi-core processor 103 is illustrated further below with respect to FIG. 4. The multi-core processor 130 may be an integrated circuit (ID), such as a semiconductor integrated circuit chip. In some embodiments, additional or different processors may also be present in the computing device 100. For example, additional processors may include processors that are heterogeneous or asymmetric to processor 130, accelerators (such as, for example, graphics accelerators or digital signal processing (DSP) units), field programmable gate arrays, or any other processor.

As shown in FIG. 1, multi-core processor 103 includes a plurality of core central processing units (CPUs), which are shown as CPUs 135. Of course, additional or fewer processor cores may be used for the CPUs 135. It should be understood that the core(s) may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Hardware 110 may include integrated circuit chips, such as those selected from integrated circuit chipsets (e.g., graphics memory and I/O controller hub chipsets), although other integrated chips may also, or alternatively, be used. Hardware 110 may also include devices 115, such as controllers, storage devices, media cards (video, sound, etc.), and/or network cards. In some embodiments, devices 115 may include pseudo-devices that are emulated devices.

Memory 120 may include one or more of the following types of memory: semiconductor firmware memory, programmable memory, non-volatile memory, read-only memory, electronically-programmable memory, random access memory, flash memory (which may include, for example. NAND or NOR type memory structures), magnetic disk memory, and/or optical disk memory. Machine-readable firmware program instructions may be stored in memory 120. These instructions may be accessed and executed by CPUs 135 to provide operating system OS 140.

OS 140 may include a general OS or an embedded OS. In one embodiment, OS 140 may execute a managed runtime environment (MRE) 150. However, in other embodiments, MRE 150 may be implemented to run directly on hardware 110 using multi-core processor 130. In some embodiments, MRE 150 may include its own instruction set and an OS (not shown). MRE 150 may dynamically load and execute code that is delivered to it in a portable bytecode format. MRE 150 may also convert the bytecodes into native instructions through interpretation and compilation.

MRE 150 may include a core virtual machine (VM) 160 capable of interpreting and/or compiling the received bytecodes into instructions understood by multi-core processor 130. For at least one embodiment, the core VM 160 is a Java™ VM (JVM). For at least another embodiment, the core VM 160 is a Common Language Infrastructure (CLI) for C++ programs. The core VM 160 may include an execution engine 162 that may directly interpret the bytecodes to execute them. The core VM 160 may also include a compiled code region 164 that includes memory space that the native code may occupy. Although not shown, the core VM 160 may also include additional runtime memory areas including a heap, program counter registers, stacks, virtual method tables, and so on.

MRE 150 also includes a just-in-time (JIT) compiler 155. Instead of using the relatively slower interpretation provided by the execution engine 162, the MRE 150 may execute native code generated by the JIT compiler 155. The first time a method is invoked, the JIT compiler 155 may compile the bytecode of the given method into a native code of the multi-core processor 130 on which the MRE 150 is executing. In embodiments of the disclosure, the JIT compiler 155 optimizes bytecode of a program with optimizations (e.g. branch predictions, etc.) to improve processing speed of the program.

The MRE 150 may further include a runtime code manager 170. Runtime code manager dynamically manages the layout of compiled native codes within the compiled code region 164. The runtime code manager 170 utilizes runtime event information to determine that compiled code should be reorganized and to determine the layout for re-organized native codes. In one embodiment, the event information includes information concerning the execution of methods during runtime and is, thus, dynamically generated. The dynamic event information is generated by hardware during a current execution of an application program. That is, the event information reflects actual real-time behavior during current execution of the application program and is not based on information generated during a prior instrumented run of the application program.

In some embodiments, the event information includes an occurrence of a misprediction of optimized code. A misprediction may include an incorrect prediction of a direction that a branch in code may take. When a portion of optimized code results in a misprediction, this portion of optimized code may be referred to as an "unsafe optimization." When an unsafe optimization occurs, a misprediction manger 175 of the runtime code manager 170 is invoked to handle the misprediction resulting from the optimized code generated by MRE 150, in order to allow the multi-core processor 130 to recover to a safe state. In one embodiment, the safe state includes atomic execution of the code region having the unsafe optimization. In other words, the misprediction manager 175 causes an unoptimized version of the code region to be issued and executed upon resumption of operations of the application program. Furthermore, the misprediction manager 175 may isolate the portions of code that cause a high number of mispredictions and disable these portions from being optimized in future runs of the application program. To accomplish this, the misprediction manager 175 may keep track of faults, identify delinquent components and selectively pessimize parts of the optimized region, as discussed further below with respect to FIG. 4.

Figure 2:
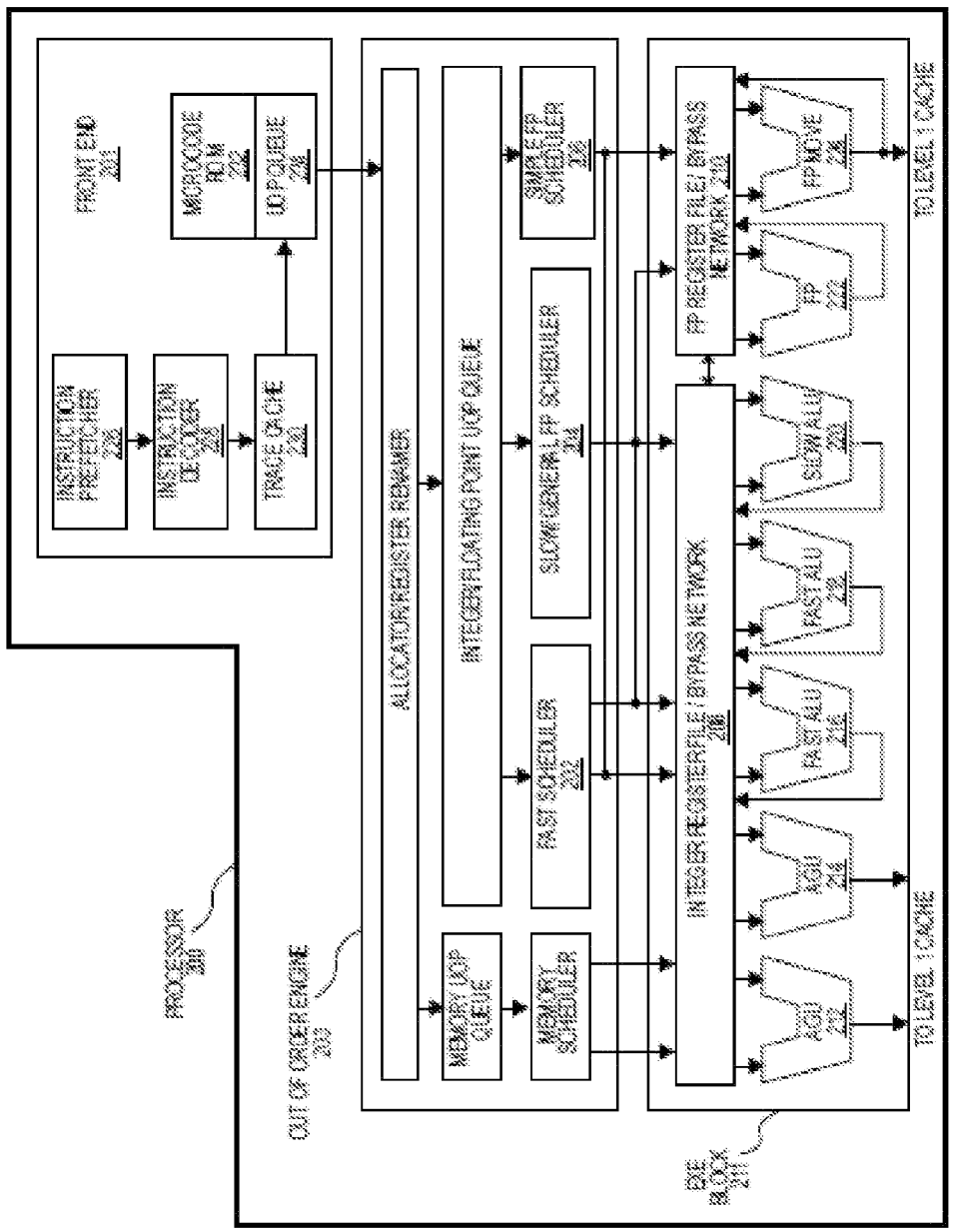
FIG. 2 is a block diagram illustrating a processor in which at least one embodiment may be used.

FIG. 2 illustrates a block diagram of the micro-architecture for a processor 200 that includes logic circuits to perform identification and management of unsafe optimizations in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 216, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGUT) 212. AGU 214, fast ALIT 216, fast ALU 218, slow ALIT 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

In one embodiment, processor 200 also includes logic to implement identification and management of unsafe optimizations according to embodiments of the invention. For example, processor 200 may include logic to execute an MRE, such as MRE 150 described with respect to FIG. 1, where the MRE implements identification and management of unsafe optimizations. In other embodiments, and as discussed further below with respect to FIG. 4, processing device 200 may include hardware circuitry to provide a last taken branch (e.g., a register to store this information), a global misprediction cache, a global misprediction counter, and a timer, which operate in conjunction with the MRE to provide identification and management of unsafe optimizations according to at least one embodiment.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
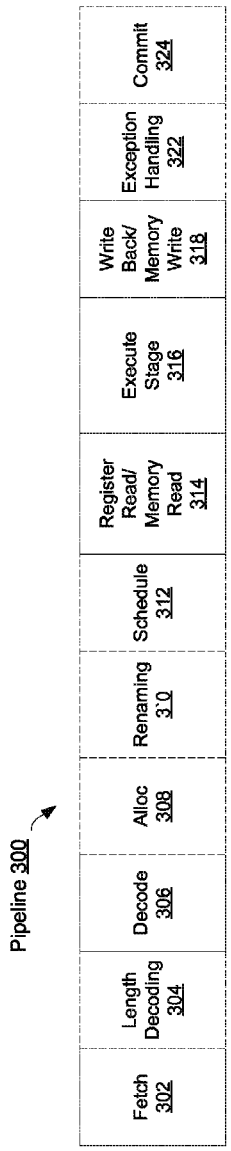
FIG. 3A illustrates elements of a processor micro-architecture according to one embodiment.

FIG. 3A is a block diagram illustrating an in-order pipeline and a register renaming stage, out-of-order issue/execution pipeline in which at least one embodiment of the disclosure may be used. The solid lined boxes in FIG. 3A illustrate an in-order pipeline, while the dashed lined boxes illustrates an register renaming, out-of-order issue/execution pipeline. In FIG. 3A, a processor pipeline 300 includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324.

Figure 3B:
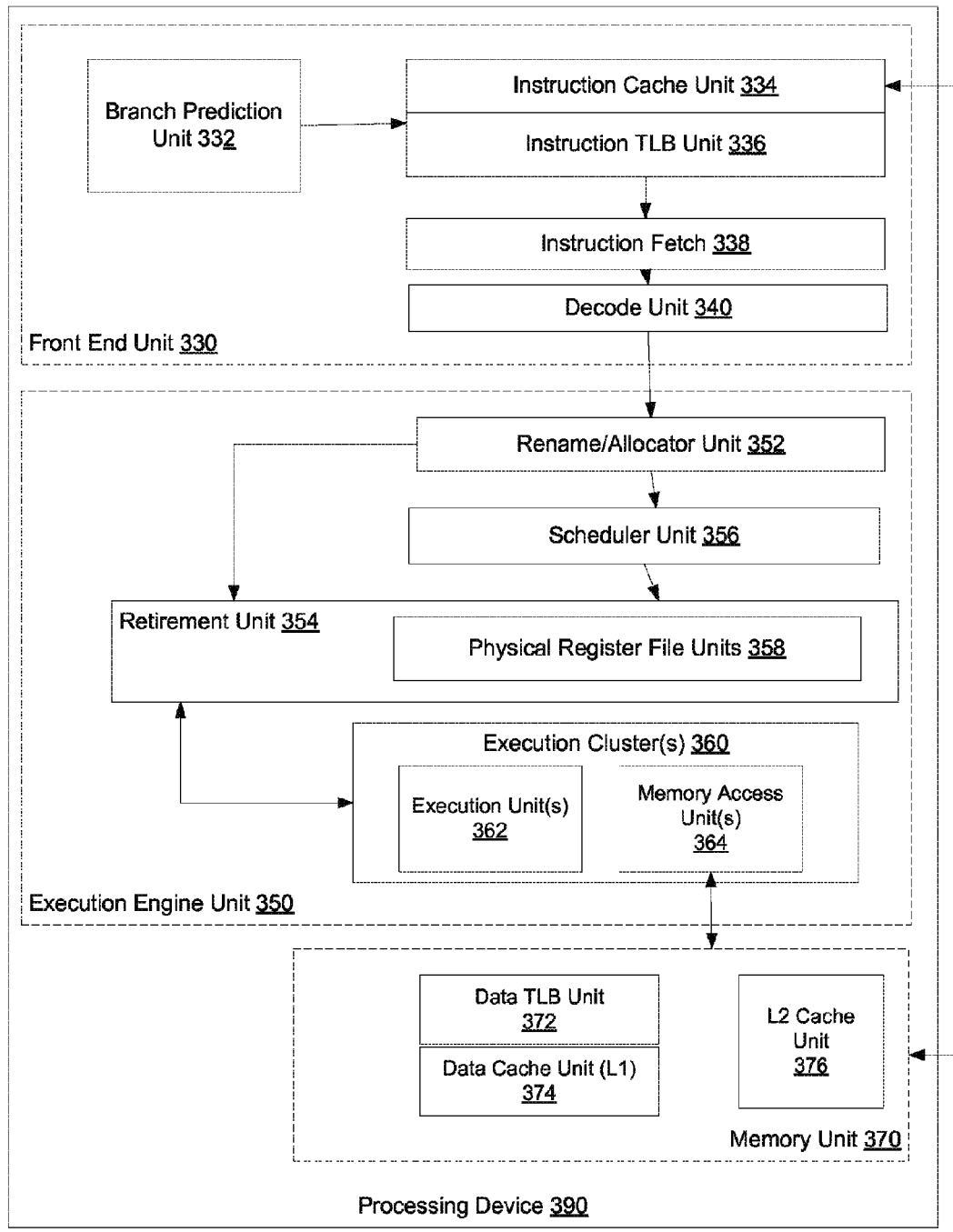
FIG. 3B illustrates a block diagram of a micro-architecture for a processor that implements identification and management of unsafe optimization in which at least one embodiment may be used.

FIG. 3B illustrates a block diagram of a micro-architecture for a processor 390 that implements identification and management of unsafe optimizations in which one embodiment of the disclosure may be used. Specifically, processor 390 depicts an in-order architecture core and a register renaming logic, out-of-order issue/execution logic to be included in a processor according to at least one embodiment of the invention. In one embodiment, any of CPUs 135 of FIG. 1 may be implemented as processor 390.

Processor 390 includes a front end unit 330 coupled to an execution engine unit 350, and both are coupled to a memory unit 370. The processor 390 may include a reduced instruction set computing (RISC) core, a complex instruction set computing (CISC) core, a very long instruction word (VLIW) core, or a hybrid or alternative core type. As yet another option, processor 390 may include a special-purpose core, such as, for example, a network or communication core, compression engine, graphics core, or the like. In one embodiment, processor 390 may be a multi-core processor or may be part of a multi-processor system, such as system 600 described further below with respect to FIG. 6.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 334 is further coupled to the memory unit 370. The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations (RS), central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 358 is overlapped by the retirement unit 354 to illustrate various ways in which register renaming and out-of-order execution may be implemented (e.g., using a reorder buffer(s) and a retirement register file(s), using a future file(s), a history buffer(s), and a retirement register file(s) using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which may include a data TLB unit 372, a data cache unit (DCU) (i.e., L1 cache) 374, and a level 2 (L2) cache unit 376, to name a few examples. In some embodiments DCU 374 is also known as a first level data cache (L1 cache). The DCU 374 may handle multiple outstanding cache misses and continue to service incoming stores and loads. It also supports maintaining cache coherency. The data TLB unit 372 is a cache used to improve virtual address translation speed by mapping virtual and physical address spaces. In one exemplary embodiment, the memory access units 364 may include a load unit, a store address unit, and a store data unit, each of which is coupled to the data TLB unit 372 in the memory unit 370. The L2 cache unit 376 may be coupled to one or more other levels of cache and eventually to a main memory.

The processor 390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

In one embodiment, processor 390 also includes logic to implement identification and management of unsafe optimizations according to embodiments of the invention. For example, processor 390 may include logic to execute an MRE, such as MRE 150 described with respect to FIG. 1, where the MRE implements identification and management of unsafe optimizations. In other embodiments, and as discussed further below with respect to FIG. 4, processing device 390 may include hardware circuitry to provide a last taken branch (e.g., a register to store this information), a global misprediction cache, a global misprediction counter, and a timer, which operate in conjunction with the MRE to provide identification and management of unsafe optimizations according to at least one embodiment.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
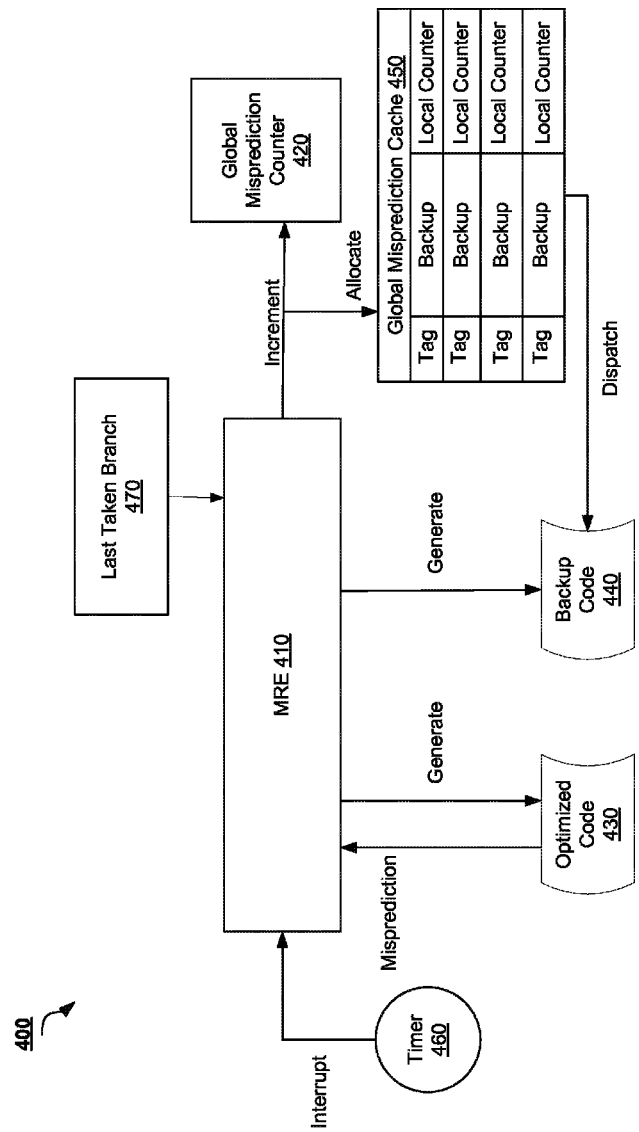
FIG. 4 illustrates a block diagram illustrating a system for identification and management of unsafe optimizations in which at least one embodiment of the disclosure may be used.

FIG. 4 illustrates a block diagram of a system 400 for identification and management of unsafe optimizations in which at least one embodiment of the disclosure may be used. System 100 includes an MRE 410, a global misprediction counter 420, a global misprediction cache 450, a timer 460, and a last taken branch 470. In embodiments of the disclosure, the components 410, 420, 450, 460, 470 may be implemented fully in software, hardware, firmware, or some combination of the above. For example, in some embodiments, components 420, 450, 460, and 470 are implemented in hardware circuitry (e.g., in processor 130 of FIG. 1, processor 200 of FIG. 2, and/or processor 390 of FIG. 3B) that is communicably coupled to MRE 410.

In one embodiment, MRE 410 is the same as MRE 150 of FIG. 1. In some embodiments, although not specifically illustrated, MRE 410 includes the misprediction manager 175 discussed with respect to FIG. 1 to perform aspects of the identification and management of unsafe optimization described herein. MRE 410 generates optimized code 430 that may include an unsafe optimization. As previously discussed, an unsafe optimization occurs when a misprediction (e.g., wrong branch prediction, etc.) arises during runtime of the optimized code. MRE 410 also generates backup code 440 when such an unsafe optimization occurs.

The MRE 410 may manage the global misprediction counter (GMC) 420 and the global misprediction cache (MC) 450. Each entry in the MC 450 contains the address (tag) of the failing optimization code region, a pointer to backup code for that code region, and a local misprediction counter (LMC) associated with the code region. In some embodiments, the MC 450 may include additional information regarding a failing optimization code region and is not limited to the data described above.

System 400 also includes a timer 460 that periodically generates interrupts to the MRE 410 to clear the counters (i.e., GMC 420 and LMCs). The system may also include storage for a last taken branch 470 of the executing code. In one embodiment, the storage for the last taken branch 470 may comprise a hardware register.

In embodiments of the invention, the components of system 400 operate together to identify and selectively manage unsafe optimizations. When a misprediction in optimized code 430 generated by the MRE 410 occurs, the MRE 410 is notified (e.g., by the processor executing the optimized code). When the notification is received, the MRE 410 increments the GMC 420. The GMC 420 tracks an overall number of mispredictions occurring with respect to optimized code 430 generated by the MRE 410.

On the first misprediction of any portion of the optimized code 430, the MRE 410 generates a backup version 440 of the code region that failed, where the backup version 440 does not include the optimization. In addition, the MRE 410 allocates a new entry in the MC 450 for the portion of the code having the failing optimization. The MRE 410 may identify the portion of optimized code that failed by reading storage for a last taken branch 470 that, in one embodiment, is exposed as a control register that can be read.

The MRE 410 then writes data to the newly-allocated entry in the MC 450, where the data includes the address of the failing optimization (tag), a pointer to the backup code 440, and the LMC for that portion of optimized code 430 associated with the unsafe optimization. After handling the first miss for a portion of optimized code, execution continues for the portion of code having the unsafe optimization by utilizing the generated backup code 440. However, as soon as the program code is to be executed again, the optimized code 430 is dispatched again and includes the optimized version of the portion of code having the unsafe optimization.

In further embodiments, any time a misprediction occurs in the optimized code 430 again, the GMC 420 is increased again. Each time the GMC 420 is increased, the MRE 410 determines whether a value of the GMC 420 is below a global pessimization threshold (GPT). In one embodiment, a system administrator may set the value of the GPT, and this value may be stored in memory associated with the MRE 410. If the value of the GMC 420 is below the GPT, then the MRE 410 checks the MC 450 to determine if an entry exists for the portion of code having the unsafe optimization. If there is a hit, then the pointer to the backup code 440 may be used to issue the backup code 440 for continuing execution purposes. If there is not a hit, then a new entry is allocated in the MC 450 for the portion of code having the unsafe optimization per the above description.

In some embodiments, it may happen that a misprediction entry is evicted from the MC 450. In this case, the backup code 440 associated with the particular entry is not discarded, but instead is recorded in memory. When a misprediction happens and there is no corresponding entry in the MC 450, the system 400 may then perform a lookup for these stored backup versions before creating a new version of backup code 440.

In one embodiment, if the GMC is above the GPT, then the MC 450 is checked according to the above. However, in this case, in addition to dispatching the backup code 440, the LMC of the entry is increased by one, while the GMC 420 is reset to zero. Whenever the LMC of an MC 450 entry is increased, the value of the LMC is compared against a local pessimization threshold (LPT). In one embodiment, a system administrator may set the value of GPT, and this value may be stored in memory associated with the MRE 410. The LPT may be the same for each entry in the MC 450. If the LPT is not exceeded, then the backup code 440 is issued as per the above.

On the other hand, if the LPT is exceeded, then the optimized code 430 is determined to be causing too many mispredictions and is to be recompiled. When this occurs, the MRE 410 generates a new version of the optimized code. In one embodiment, this new version of optimized code disables any optimizations to the portion of code that exceeded the LPT. As a result, going forward, the optimized version of the program code is run without optimizations for that particular portion/region of code that had become problematic.

Lastly, tinier 460 periodically generates interrupts to the MRE 410. On these interrupts, the MRE 410 sets to zero the GMC 420 and all of the LMCs in MC 450. As a result, timer 460 facilitates the MRE 410 in speculating mispredictions over set periods of time. The MRE 410 may use the GMC 420 and LMCs to sample which optimizations are significantly harming performance. If an optimized code region does not fail very often and most of time results in performance gains, then the MRE 410 keeps this optimized code as a result of the resets of the counters (GMC 420 and LMCs) caused by timer 460.

Figure 5:
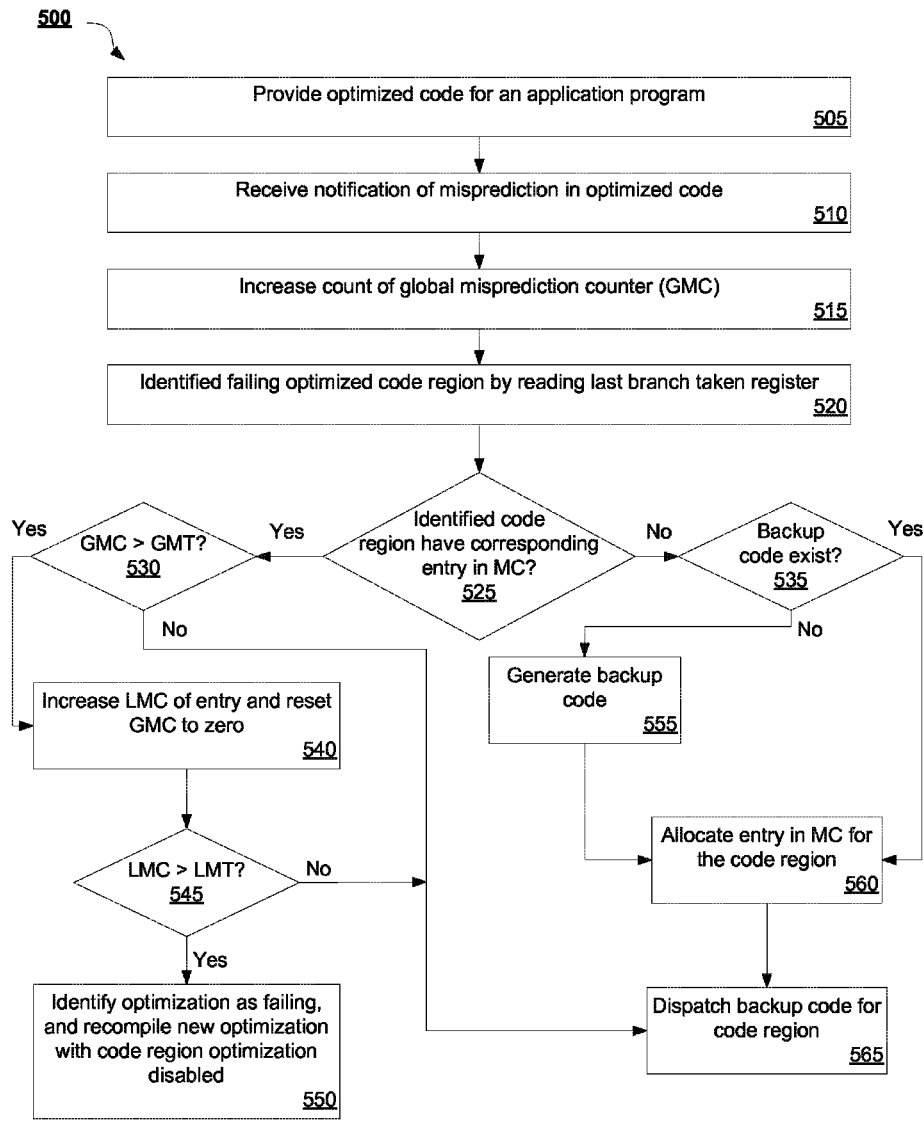
FIG. 5 is a flow diagram a method for identifying and managing unsafe optimizations according to an embodiment of the disclosure.

FIG. 5 is a flow diagram illustrating a method 500 for identifying and managing unsafe optimizations according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by MRE 150 of FIG. 1.

Method 500 begins at block 505 where optimized code for an application is provided to a processor for execution. In one embodiment, an MRE provides this optimized code to the processor. At block 510, notification of a misprediction during runtime of the optimized code is received. In one embodiment, the processor provides this notification to the MRE. Then, at block 515, a count of a global misprediction counter is increased to reflect the occurrence of the misprediction by the optimized code. At block 520, a failing code region of the optimized code is identified via a read of a last branch taken data store. In one embodiment, the last branch taken data store is a hardware control register.

At decision block 525, it is determined whether the identified code region has a corresponding entry in an MC associated with the MRE. In one embodiment, the MC is implemented as a software cache of the MRE. In other embodiments, the MC is implemented in hardware separate from, but accessible by, the MRE. If an entry if the MC corresponding to the identified code region does exist, then method 500 proceeds to decision block 530 to determine whether the GMC exceeds a GMT. If so, then method 500 proceeds to block 540 to increase an LMC of the corresponding entry and reset the GMC to zero. Then, at decision block 545, after the LMC is increased, it is compared to an LMT to determine if it exceeds the LMT. If so, then at block 550, the code optimization is identified as failing due to excessive failure of optimization at the code region. In addition, a new optimized code version is created via recompilation, with the identified code region disabled for purposes of optimization.

Returning to decision blocks 530 and 545, if either of the GMC or the LMC does not exceed the GMT or the LMT, respectively, then method 500 proceeds to block 565 where backup code for the identified code region is dispatched. In one embodiment, the backup code is identified via a pointer kept in the entry of the MC associated with the identified code region.

Returning to decision block 525, if the identified code region does not have a corresponding entry in the MC, then method 500 proceeds to decision block 535 where it is determined whether a version of backup code for the identified code region exists. In one embodiment, memory is checked for the backup code for the identified code region. If the backup code does not exist, then method 500 continues to block 555 to generate the back up code and then proceed to block 560. On the other hand, if the backup code does exist, then method 500 proceeds directly to block 560. At block 560, an entry in the MC is allocated for the identified code region. In one embodiment, the entry in the MC includes a tag identifying the code region, a pointer to the backup code associated with the code region, and an LMC associated with the code region. Then, method 500 continues to block 565, where, as discussed above, the backup code for the identified code region is dispatched.

Figure 6:
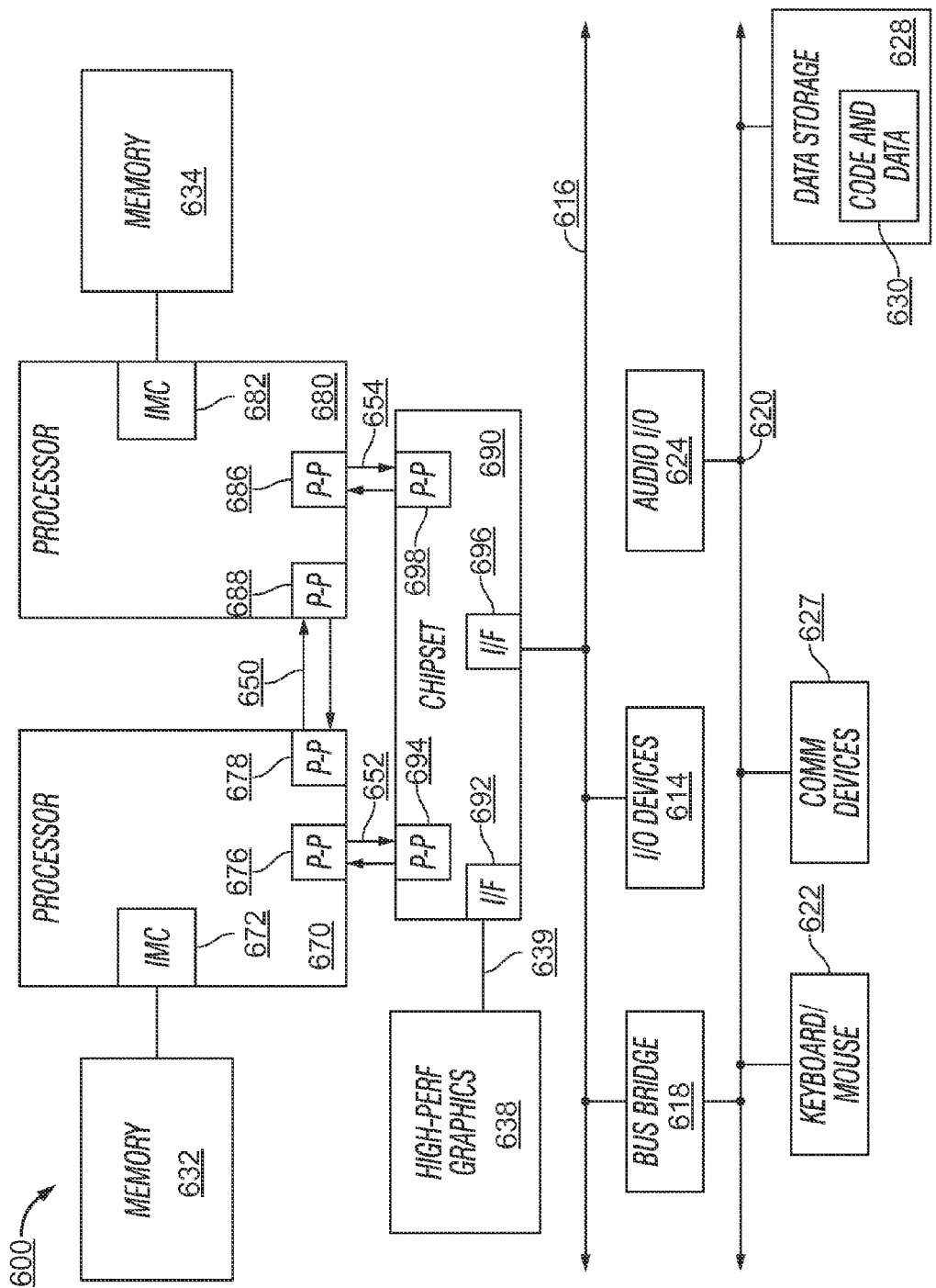
FIG. 6 illustrates a block diagram of a computer system in which at least one embodiment may be used.

Referring now to FIG. 6, shown is a block diagram of a system 600 in which an embodiment of the invention may be used. As shown in FIG. 6, multiprocessor system 600 is a point-to-point interconnect system, and includes a first processor 670 and a second processor 680 coupled via a point-to-point interconnect 650. While shown with only two processors 670, 680, it is to be understood that the scope of embodiments of the invention is not so limited. In other embodiments, one or more additional processors may be present in a given processor. In one embodiment, the multiprocessor system 600 may implement an MRE for identifying and managing unsafe optimizations as described herein.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
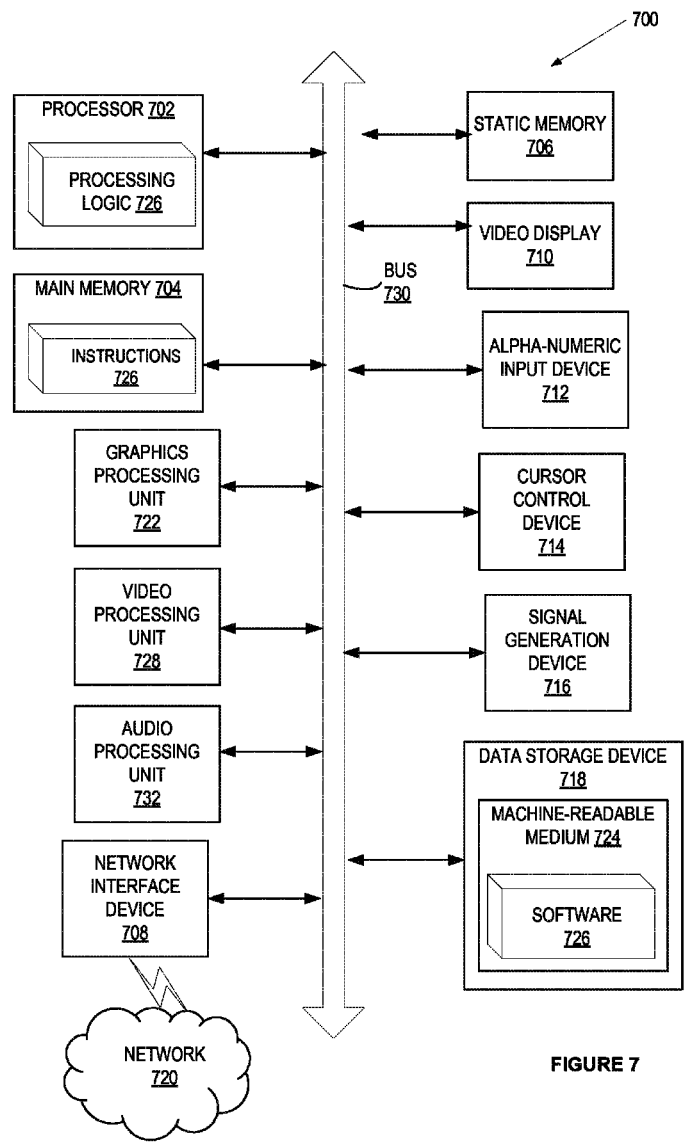
FIG. 7 illustrates a block diagram of one embodiment of a computer system.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM) etc.), a static memory 706 (e.g. flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets.

Processing device 702 may also be one or more special-purpose processing devices such as an application specific integrated circuit (ASIC), a field programmable gate array (FPGA), a digital signal processor (DSP), network processor, or the like. In one embodiment, processing device 702 may include one or processing cores. The processing device 702 is configured to execute the processing logic 726 for performing the operations and steps discussed herein. In one embodiment, processing device 702 is the same as multi-core processor 130 described with respect to FIG. 1 that implements an MRE for identifying and managing unsafe optimizations as described herein with embodiments of the disclosure.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker). Furthermore, computer system 700 may include a graphics processing unit 722, a video processing unit 728, and an audio processing unit 732.

The data storage device 718 may include a machine-accessible storage medium 724 on which is stored software 726 implementing any one or more of the methodologies of functions described herein, such as implementing an MRE for identifying and managing unsafe optimizations with restricted entries as described above. The software 726 may also reside, completely or at least partially, within the main memory 704 as instructions 726 and/or within the processing device 702 as processing logic 726 during execution thereof by the computer system 700; the main memory 704 and the processing device 702 also constituting machine-accessible storage media.

The machine-readable storage medium 724 may also be used to store instructions 726 implementing an MRE that identifies and manages unsafe optimizations, such as described with respect to MRE 150 in FIG. 1, and/or a software library containing methods that call the above applications. While the machine-accessible storage medium 728 is shown in an example embodiment to be a single medium, the term "machine-accessible storage medium" should be taken to include a single medium or multiple media (e.g. a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

The following examples pertain to further embodiments. Example 1 is a method for identifying and managing unsafe optimizations comprising receiving, by a managed runtime environment (MRE) executed by a processing device, a notice of misprediction of optimized code, the misprediction occurring during a runtime of the optimized code, determining, by the MRE, whether a local misprediction counter (LMC) associated with a code region of the optimized code causing the misprediction exceeds a local misprediction threshold (LMT) value, and when the LMC exceeds the LMT value, compiling, by the MRE, native code of the optimized code to generate a new version of the optimized code, wherein the code region in the new version of the optimized code is not optimized. In Example 2, the subject matter of Example 1 can optionally include wherein the misprediction comprises an incorrect branch speculation of the optimized code. In Example 3, the subject matter of any one of Examples 1-2 can optionally include increasing a global misprediction counter (GMC) associated with the optimized code when the notice of misprediction is received.

In Example 4, the subject matter of any one of Examples 1-3 can optionally include when the GMC exceeds a global misprediction threshold (GMT) value, increasing the LMC, and performing the determining whether the LMC exceeds the LMT value. In Example 5, the subject matter of any one of Examples 1-4 can optionally include resetting the GMC when the LMC is increased. In Example 6, the subject matter of any one of Examples 1-5 can optionally include receiving an indication of an expiration of a timer, and resetting the GMC and the LMC to zero in response to the indication of the expiration of the timer.

In Example 7, the subject matter of any one of Examples 1-6 can optionally include resetting the LMC to zero subsequent to the compiling. In Example 8, the subject matter of any one of Examples 1-7 can optionally include identifying the code region via a last branch taken register, and determining whether an entry exists in a global misprediction cache (MC) that is associated with the identified code region.

In Example 9, the subject matter of any one of Examples 1-8 can optionally include when an entry does exists in the MC for the identified code region and when the GMC does not exceed the GMT, dispatching a backup version of the code region for execution by a processing device. In Example 10, the subject matter of any one of Examples 1-9 can optionally include wherein the backup version comprises an unoptimized version of the native code of the optimized code.

In Example 11, the subject matter of any one of Examples 1-10 can optionally include when an entry does not exist in the MC, determining whether the backup version exists in memory, when the backup version does not exist, generating the backup version, allocating an entry in the MC for the identified code region; and dispatching the backup version of the code region for execution by a processing device. In Example 12, the subject matter of any one of Examples 1-11 can optionally include wherein the entry in the MC comprises a tag identifying the code region, a pointer to the backup version of the code, and the LMC for the code region.

Example 13 is an apparatus for identifying and managing unsafe optimizations comprising a plurality of registers and a main processing unit to execute a managed runtime environment (MRE) that generates an optimized version of code, execute the optimized version of code, and send notification of occurrence of a misprediction during the execution of the optimized version of the code, the notice sent to the MRE. In Example 13, the MRE is to determine whether a local misprediction counter (LMC) associated with a code region of the optimized code causing the misprediction exceeds a local misprediction threshold (LMT) value, and when the LMC exceeds the LMT value, compile native code of the optimized code to generate a new version of the optimized code, wherein the code region in the new version of the optimized code is not optimized.

In Example 14, the subject matter of Example 13 can optionally include wherein the misprediction comprises an incorrect branch speculation of the optimized code. In Example 15, the subject matter of any one of Examples 13-14 can optionally include wherein the MRE further to increase a global misprediction counter (GMC) associated with the optimized code when the notice of misprediction is received. In Example 16, the subject matter of any one of Examples 13-15 can optionally include wherein the MRE further to, when the GMC exceeds a global misprediction threshold (GMT) value, increase the LMC, and perform the determining whether the LMC exceeds the LMT value.

In Example 17, the subject matter of any one of Examples 13-16 can optionally include wherein the MRE further to reset the GMC when the LMC is increased. In Example 18, the subject matter of any one of Examples 13-17 can optionally include wherein the MRE further to receive an indication of an expiration of a timer, and reset the GMC and the LMC to zero in response to the indication of the expiration of the timer. In Example 19, the subject matter of any one of Examples 13-18 can optionally include wherein the MRE further to reset the LMC to zero subsequent to the compiling. In Example 20, the subject matter of any one of Examples 13-19 can optionally include wherein the MRE further to identify the code region via a last branch taken register, and determine whether an entry exists in a global misprediction cache (MC) that is associated with the identified code region.

In Example 21, the subject matter of any one of Examples 13-20 can optionally include wherein the MRE further to, when an entry does exists in the MC for the identified code region and when the GMC does not exceed the GMT, dispatch a backup version of the code region for execution by a processing device. In Example 22, the subject matter of any one of Examples 13-21 can optionally include wherein the MRE further to, when an entry does not exist in the MC determine whether the backup version exists in memory, when the backup version does not exist, generate the backup version, allocate an entry in the MC for the identified code region, and dispatch the backup version of the code region for execution by a processing device. All optional features of the apparatus described above may also be implemented with respect to the method or process described herein.

Example 23 is a system for identifying and managing unsafe optimizations. In Example 23, the system includes a processing device, a memory communicably coupled to the processing device, the memory to store instructions to execute a managed runtime environment (MRE), and the MRE executable from the memory by the processing device. In Example 23, the MRE is to receive, from the processing device, a notice of misprediction of optimized code, the misprediction occurring during a runtime of the optimized code and comprising an incorrect branch speculation of the optimized code, determine whether a local misprediction counter (LMC) associated with a code region of the optimized code causing the misprediction exceeds a local misprediction threshold (LMT) value, and when the LMC exceeds the LMT value, compile native code of the optimized code to generate a new version of the optimized code, wherein the code region in the new version of the optimized code is not optimized.

In Example 24, the subject matter of Example 23 can optionally include wherein the MRE further to increase a global misprediction counter (GMC) associated with the optimized code when the notice of misprediction is received. In Example 25, the subject matter of any one of Examples 23-24 can optionally include wherein the MRE further to when the GMC exceeds a global misprediction threshold (GMT) value, increase the LMC, and perform the determining whether the LMC exceeds the LMT value. In Example 26, the subject matter of any one of Examples 23-25 can optionally include wherein the MRE further to reset the GMC when the LMC is increased.

In Example 27, the subject matter of any one of Examples 23-26 can optionally include wherein the MRE further to receive an indication of an expiration of a timer, and reset the GMC and the LMC to zero in response to the indication of the expiration of the timer. In Example 28, the subject matter of any one of Examples 23-27 can optionally include wherein the MRE further to reset the LMC to zero subsequent to the compiling. In Example 29, the subject matter of any one of Examples 23-28 can optionally include wherein the MRE further to identify the code region via a last branch taken register, and determine whether an entry exists in a global misprediction cache (MC) that is associated with the identified code region, wherein the entry in the MC comprises a tag identifying the code region, a pointer to the backup version of the code, and the LMC for the code region.

In Example 30, the subject matter of any one of Examples 23-29 can optionally include wherein the MRE further to, when an entry does exists in the MC for the identified code region and when the GMC does not exceed the GMT, dispatch a backup version of the code region for execution by a processing device. In Example 31, the subject matter of any one of Examples 23-30 can optionally include wherein the backup version comprises an unoptimized version of the native code of the optimized code. In Example 32, the subject matter of any one of Examples 23-31 can optionally include wherein the MRE further to, when an entry does not exist in the MC, determine whether the backup version exists in memory, when the backup version does not exist, generate the backup version, allocate an entry in the MC for the identified code region, and dispatch the backup version of the code region for execution by a processing device. All optional features of the system described above may also be implemented with respect to the method or process described herein.

Example 33 is non-transitory computer-readable medium for identifying and managing unsafe optimizations comprising means. In Example 33, the non-transitory machine-readable medium includes data that, when accessed by a processing device, cause the processing device to perform operations comprising receiving, by a managed runtime environment (MRE) executed by the processing device, a notice of misprediction of optimized code, the misprediction occurring during a runtime of the optimized code, determining, by the MRE, whether a local misprediction counter (LMC) associated with a code region of the optimized code causing the misprediction exceeds a local misprediction threshold (LMT) value, and when the LMC exceeds the LMT value, compiling, by the MRE, native code of the optimized code to generate a new version of the optimized code, wherein the code region in the new version of the optimized code is not optimized.

In Example 34, the subject matter of Example 33 can optionally include wherein the misprediction comprises an incorrect branch speculation of the optimized code. In Example 35, the subject matter of any one of Examples 33-34 can optionally include increasing a global misprediction counter (GMC) associated with the optimized code when the notice of misprediction is received, and when the GMC exceeds a global misprediction threshold (GMT) value, increasing the LMC, and performing the determining whether the LMC exceeds the LMT value.

In Example 36, the subject matter of any one of Examples 33-35 can optionally include resetting the GMC when the LMC is increased. In Example 37, the subject matter of any one of Examples 33-36 can optionally include receiving an indication of an expiration of a timer, and resetting the GMC and the LMC to zero in response to the indication of the expiration of the timer. In Example 38, the subject matter of any one of Examples 33-37 can optionally include resetting the LMC to zero subsequent to the compiling.

In Example 39, the subject matter of any one of Examples 33-38 can optionally include identifying the code region via a last branch taken register, and determining whether an entry exists in a global misprediction cache (MC) that is associated with the identified code region. In Example 40, the subject matter of any one of Examples 33-39 can optionally include when an entry does exists in the MC for the identified code region and when the GMC does not exceed the GMT, dispatching a backup version of the code region for execution by a processing device, wherein the backup version comprises an unoptimized version of the native code of the optimized code. In Example 41, the subject matter of any one of Examples 33-40 can optionally include when an entry does not exist in the MC, determining whether the backup version exists in memory, when the backup version does not exist, generating the backup version, allocating an entry in the MC for the identified code region, and dispatching the backup version of the code region for execution by a processing device.

Example 42 is an apparatus for identifying and managing unsafe optimizations comprising means for receiving a notice of misprediction of optimized code, the misprediction occurring during a runtime of the optimized code, means for determining, whether a local misprediction counter (LMC) associated with a code region of the optimized code causing the misprediction exceeds a local misprediction threshold (LMT) value, and when the LMC exceeds the LMT value, means for compiling native code of the optimized code to generate a new version of the optimized code, wherein the code region in the new version of the optimized code is not optimized. In Example 43, the subject matter of Example 42 can optionally include the apparatus further configured to perform the method of any one of the claims 2 to 12.

In Example 44, the subject matter of Example 23 further configured to perform the method of any one of the claims 2 to 12.

Example 45 is at least one machine readable medium comprising a plurality of instructions that in response to being executed on a computing device, cause the computing device to carry out a method according to any one of Examples 1-12. Example 46 is an apparatus for identifying and managing unsafe optimizations, configured to perform the method of any one of Examples 1-12. Example 47 is an apparatus comprising means for performing the method of any one of Examples 1-12. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e. stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising: a plurality of registers; a processing core to: execute a managed runtime environment (MRE) that generates an optimized version of code; execute the optimized version of code; and send notification of occurrence of a misprediction during the execution of the optimized version of the code, the notice sent to the MRE; wherein the MRE is to: determine whether a local misprediction counter (LMC) associated with a code region of the optimized code causing the misprediction exceeds a local misprediction threshold (LMT) value; in response to the LMC exceeds the LMT value, compile native code of the optimized code to generate a new version of the optimized code, wherein the code region in the new version of the optimized code is not optimized; increase a global misprediction counter (GMC) associated with the optimized code in response to the notice of misprediction being received; and if the GMC exceeds a global misprediction threshold (GMT) value: increase the LMC; determine whether the LMC exceeds the LMT value; and reset the GMC if the LMC is increased.

2. The processing device of claim 1, wherein the misprediction comprises an incorrect branch speculation of the optimized code.

3. The processing device of claim 1, wherein the MRE is further to: receive an indication of an expiration of a timer; reset the GMC and the LMC to zero in response to the indication of the expiration of the timer; and reset the LMC to zero subsequent to the compiling.

4. The processing device of claim 1, wherein the MRE is further to: identify the code region via a last branch taken register; and determine whether an entry exists in a global misprediction cache (MC) that is associated with the identified code region.

5. The processing device of claim 4, wherein the MRE is further to, if an entry does exists in the MC for the identified code region and if the GMC does not exceed the GMT, dispatch a backup version of the code region for execution by a processing device.

6. The processing device of claim 4, wherein the MRE is further to, if an entry does not exist in the MC: determine whether the backup version exists in memory; if the backup version does not exist, generate the backup version; allocate an entry in the MC for the identified code region; and dispatch the backup version of the code region for execution by a processing device.

7. A system, comprising: a processing device; a memory communicably coupled to the processing device, the memory to store instructions to execute a managed runtime environment (MRE); and the MRE executable from the memory by the processing device, wherein the MRE is to: receive, from the processing device, a notice of misprediction of optimized code, the misprediction occurring during a runtime of the optimized code and comprising an incorrect branch speculation of the optimized code; determine whether a local misprediction counter (LMC) associated with a code region of the optimized code causing the misprediction exceeds a local misprediction threshold (LMT) value; in response to the LMC exceeds the LMT value, compile native code of the optimized code to generate a new version of the optimized code, wherein the code region in the new version of the optimized code is not optimized; increase a global misprediction counter (GMC) associated with the optimized code in response to the notice of misprediction being received; and if the GMC exceeds a global misprediction threshold (GMT) value: increase the LMC; determine whether the LMC exceeds the LMT value; and reset the GMC if the LMC is increased.

8. The system of claim 7, wherein the MRE is further to: receive an indication of an expiration of a timer; reset the GMC and the LMC to zero in response to the indication of the expiration of the timer; and reset the LMC to zero subsequent to the compiling.

9. The system of claim 7, wherein the MRE is further to: identify the code region via a last branch taken register; and determine whether an entry exists in a global misprediction cache (MC) that is associated with the identified code region; wherein the entry in the MC comprises a tag identifying the code region, a pointer to the backup version of the code, and the LMC for the code region.

10. The system of claim 9, wherein the MRE is further to, if an entry does exists in the MC for the identified code region and if the GMC does not exceed the GMT, dispatch a backup version of the code region for execution by a processing device, wherein the backup version comprises an unoptimized version of the native code of the optimized code.

11. The system of claim 9, wherein the MRE is further to, if an entry does not exist in the MC: determine whether the backup version exists in memory; if the backup version does not exist, generate the backup version; allocate an entry in the MC for the identified code region; and dispatch the backup version of the code region for execution by a processing device.

12. A computer-implemented method, comprising: receiving, by a managed runtime environment (MRE) executed by a processing device, a notice of misprediction of optimized code, the misprediction occurring during a runtime of the optimized code; determining, by the MRE, whether a local misprediction counter (LMC) associated with a code region of the optimized code causing the misprediction exceeds a local misprediction threshold (LMT) value; in response to the LMC exceeds the LMT value, compiling, by the MRE, native code of the optimized code to generate a new version of the optimized code, wherein the code region in the new version of the optimized code is not optimized; increasing a global misprediction counter (GMC) associated with the optimized code in response to the notice of misprediction being received; and if the GMC exceeds a global misprediction threshold (GMT) value: increasing the LMC; determine whether the LMC exceeds the LMT value; and resetting the GMC if the LMC is increased.

13. The method of claim 12, wherein the misprediction comprises an incorrect branch speculation of the optimized code.

14. The method of claim 12, further comprising: receiving an indication of an expiration of a timer; and resetting the GMC and the LMC to zero in response to the indication of the expiration of the timer.

15. The method of claim 12, further comprising resetting the LMC to zero subsequent to the compiling.

16. The method of claim 12, further comprising: identifying the code region via a last branch taken register; and determining whether an entry exists in a global misprediction cache (MC) that is associated with the identified code region.

17. The method of claim 16, further comprising, if an entry does exists in the MC for the identified code region and if the GMC does not exceed the GMT, dispatching a backup version of the code region for execution by a processing device, wherein the backup version comprises an unoptimized version of the native code of the optimized code.

18. The method of claim 16, further comprising, if an entry does not exist in the MC: determining whether the backup version exists in memory; if the backup version does not exist, generating the backup version; allocating an entry in the MC for the identified code region; and dispatching the backup version of the code region for execution by a processing device.

19. The method of claim 12, wherein the entry in the MC comprises a tag identifying the code region, a pointer to the backup version of the code, and the LMC for the code region.

* * * * *